Figure 1:
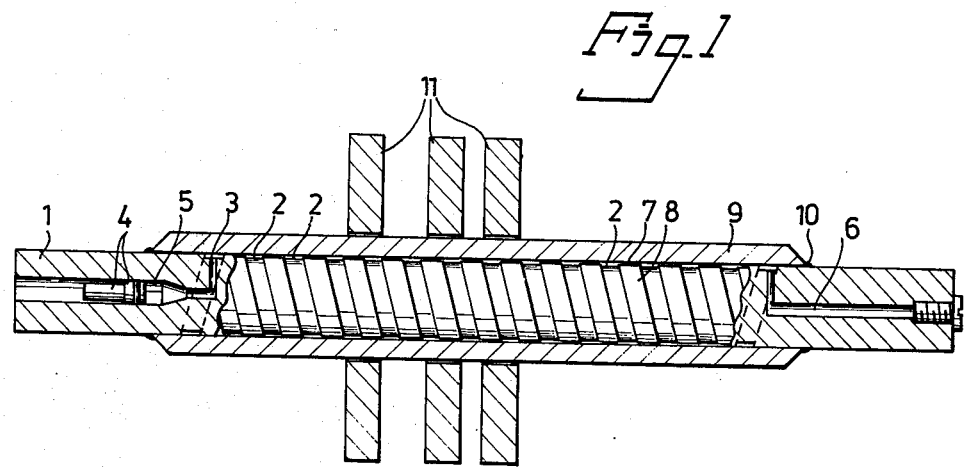

United States Patent [19]

Olsson

[11] 4,303,150
[45] Dec. 1, 1981

[54] COUPLING ASSEMBLY

[76] Inventor: Hans O. Olsson, Krondikesvägen 42B, Östersund, Sweden, 83100

[21] Appl. No.: 101,229

[22] Filed: Dec. 7, 1979

[30] Foreign Application Priority Data

Dec. 11, 1978 [SE] Sweden .............................. 7812703

[51] Int. Cl.³ .............................................. F16D 1/06
[52] U.S. Cl. .................... 192/88 B; 403/31; 188/367
[58] Field of Search ................... 192/88 B; 403/31, 5, 403/97; 188/367

[56] References Cited

U.S. PATENT DOCUMENTS

| | | | |
|---|---|---|---|
| 2,093,092 | 9/1937 | McElhany et al. | 192/88 B |
| 3,058,559 | 10/1962 | Ohrnberger | 192/88 B |
| 3,473,640 | 10/1969 | Schutz | 192/88 B |
| 3,958,681 | 5/1976 | Sugahara et al. | 192/88 B |
| 4,093,052 | 6/1978 | Falk | 192/88 B |
| 4,188,142 | 2/1980 | Olsson | 192/88 B |

Primary Examiner—George H. Krizmanich
Attorney, Agent, or Firm—Christie, Parker & Hale

[57] ABSTRACT

A pressurized hydraulic fluid actuated coupling assembly for detachably coupling to an element. The assembly has first and second concentric walls secured together at the ends. The second wall is adapted for engaging the element. One of the walls has grooves defining corresponding recesses between the first and second walls. Ridges on such one wall are defined between adjacent recesses. Means is provided for introducing hydraulic fluid into the recesses. Means is provided for varying the pressure of the hydraulic fluid such that in the absence of fluid pressure, the ridges on the one wall are in contact with the other wall and upon pressurization of the fluid the second wall moves away from the first wall such that the second wall rigidly couples to the element and such that the ridges are spaced a predetermined distance from the other wall.

17 Claims, 2 Drawing Figures

COUPLING ASSEMBLY

TECHNICAL FIELD

The invention relates to a hydraulic coupling assembly of the type comprising an annular working chamber, one wall of which is expandable in response to pressurization of the hydraulic fluid in the chamber, whereby to engage a conform surface on a machine element which is to be coupled to the assembly.

BACKGROUND

Devices have been known for a long while for connecting together two machine parts formed with rotationally generated surfaces shaped alike, said surfaces being coaxial at the coupling, and, by utilizing hydraulic pressure, said devices bring about expansion of one of the rotationally generated surfaces to give coupling contact with the other one. Examples on such known devices are revealed in U.S. Pat. No. 4,093,052 and French Pat. No. 1,092,416. The hydraulic systems used up to now for this purpose contain an annular working chamber arranged in side one of the rotationally generated surfaces, said chamber having a wall thickness towards the coupling surface such that this wall, when the specific pressure on the hydraulic medium enclosed in the chamber is increased, elastically expands to give the desired coupling connection. The working chamber in the known devices has been uniformly thick, with relatively large space (in the order of millimeters) between its coaxial inner defining surfaces in relation to the space or clearance (some hundreths of a millimeter) between the rotationally generated surfaces which are to be coupled together. Such a construction has in many cases been found to give unsatisfactory mechanical stability to the device, e.g. in the cases where the load on the expanding wall varies along the longitudinal direction thereof.

OBJECT OF THE INVENTION

An object of the invention is therefor to provide an assembly of the above-mentioned type having enhanced mechanical stability against radial dynamic loads.

CHARACTERIZATION OF THE INVENTION

In his attempts to improve the stability of such hydraulic couplings, and thereby expand the area of their use, the inventor has started from the known fact that the thin lubricating oil filling between a journal and the bearing surface in a plain bearing has strength properties which give this bearing the high mechanical stability. Against this background, the working chamber in a hydraulic coupling, for achieving great mechanical stability should be given the same gap width or spacing between its rotationally generated inner surfaces as the clearance between shaft and bearing surface in a plain bearing. It is, however, obvious that such a construction must bring with it great difficulties, especially with regard to complete filling the hydraulic system with hydraulic medium, and to the desired rapid and uniform propagation of pressure variations through the whole of the enclosed mass of hydraulic medium, e.g. when coupling and uncoupling machine parts by means of the hydraulic device.

The invention is defined in the appended claims, and comprises, broadly speaking, two substantial features, namely that the chamber width, in the pressurized state of the chamber when the assembly engages the machine element to be coupled, is of the same order as the gap in a corresponding plain bearing wherein the hydraulic fluid would be used as lubricant. Said width is preferably less than about 0.3 mm. Normally the width should be about 0.1 mm or less and preferably be about 0.05 mm or less. By prescribing such a dimensioning for the chamber width, the approach between opposed surfaces in the chamber is retarded due to i.a. squeezing effects in the intermediate oil film. However, with such narrow gap or small width between the chamber surfaces it would be very difficult or at least time consuming to propagate the oil and pressure throughout the chamber at pressurization thereof. To overcome that problem the invention also prescribes that the working chamber should be regularly divided into zones with alternatingly very small and relatively large distances between the coaxial walls of the chamber, so that when filling by hydraulic medium, it forms an intermediate body of oil or lubricant consisting of one or a series of thin films kept together by thicker bands. Such thicker bands provide for the propagation of the oil film into the narrow gaps and the pressure throughout the chamber.

As far as structure is concerned, the invention signifies that one of the coaxial inner walls of the working chamber is provided with a uniformly distributed ridges or flanges with a height such that their crests, the surfaces of which are formed alike with the opposing working chamber wall will be situated at only clearance spacing from said wall. Such clearance spacing relates to the pressurized state of the chamber when the expandable wall thereof fully engages the machine element to be coupled. In the non-pressurized state of the chamber, the gap or clearance between the crest surfaces faces and the opposing working chamber wall could well be zero. The grooves between the ridges or flanges will simultaneously be channels for facilitating filling hydraulic medium to form a simple cohesive mass or body, and enabling relatively rapid evening-out of pressure variations.

The ridges or flanges can be axial, circular or helical, with one or more threads along the length. Said threads can be the most suitable from the point of view of manufacture. If the flanges are circular, the intermediate spaced between them should be interconnected by channels for facilitating the filling of hydraulic medium.

The invention will be described in more detail in the following while referring to the attached drawings.

DRAWINGS

The drawings illustrate in section a pair of embodiments with the helical inner walls for the working chamber.

Figure 2:
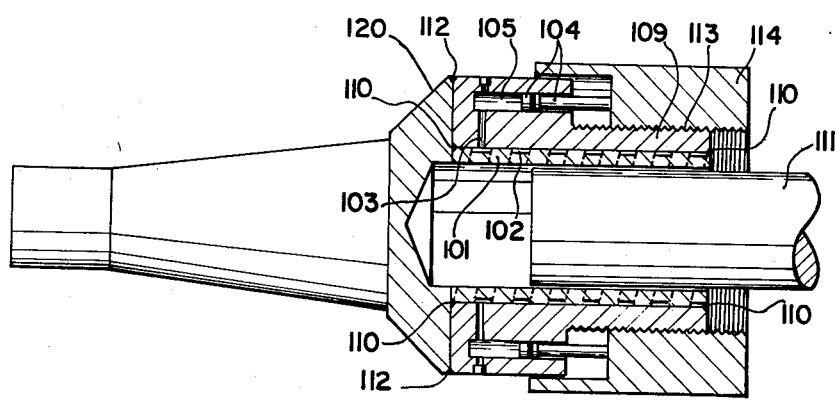

FIG. 1 is a cross-sectional view showing a first embodiment of the invention as applied to the clamping up of a plurality of tools on a common shaft, e.g. circular sawblades provided with bushings. FIG. 2 is a cross-sectional view showing an alternate embodiment of the invention as applied to a tool chuck for clamping a milling cutter.

EXAMPLES ON EMBODIMENTS

In FIG. 1 there is a shaft, denoted by the numeral 1, in the surface of which the working chamber in the hydraulic system has been formed as a helical groove 2, at one end connected to the pressure side of a piston 4 in a pressure cylinder 5, via a canal 3, and at the other end to a closeable filling nipple for hydraulic medium via a canal 6. The outer wall of the working chamber consists, in the illustrated embodiment, of a sleeve 9 drawn over the helical flange 8 with clearance 7 and welded (10) to the shaft 1, said flange defining the groove 2. Circular sawblades mounted on the sleeve 9 are denoted by 11, said sawblades being coupled to the sleeve 9 by the radial expansion of the latter when the pressure of the hydraulic medium is increased by pressing in the pressure piston 4.

In FIG. 2, the numeral 100 denotes a wall in the working chamber in the hydraulic system, the surface of said wall being formed as a helical groove 102, one end of the groove being connected to the pressure side of a piston 104 in a pressure system 105 via a canal 103. In the embodiment shown the outer wall 109 of the working chamber is welded to the wall 100 at the places denoted by 110, as in FIG. 1, and is also welded to the remaining portion of the chuck 120 at the places which are denoted by 112. The canal 103, and the pressure cylinder are formed in the outer wall 109 of the working chamber, in which a thread 113 is also made, for taking the pressure piston 104 in and out of the pressure cylinder by turning the sleeve 114.

In FIG. 2, the numeral 11 denotes the end of the milling cutter which the hydraulic device is intended to clamp.

In the two embodiments shown, the clearance 107 is preferably zero in the non-pressurized state of the device. In the pressurized state of the device, when the expandable wall engages the machine element to be coupled, said clearance should be less than about 0.3 mm. Normally the clearance should however be about 0.1 mm or less, and preferably be in the order of 0.05 mm or less.

The dimensions of the surfaces delimited by the grooves should be as large as possible. The surface dimensions are then determined by the time required to provide a full oil and pressure propagation throughout the chamber. Said time should preferably be less than a few seconds.

In tested embodiments of the invention, the groove system is in the shape of a helical groove, the hydraulic medium consists of multi purpose grease and the clearance is about 0.05 mm in the area of engagement between the expandable chamber wall and the coupled machine element, in the pressurized state of the working chamber.

I claim:

1. A pressurized hydraulic fluid actuated coupling assembly for detachably coupling to an element, said assembly comprising first and second concentric walls secured together at the ends thereof, the second wall adapted for engaging the element, one of said walls having grooves defining corresponding recesses between the first and second walls, ridges on said one wall being defined between adjacent recesses, means for introducing hydraulic fluid into the recesses and means for varying the pressure of the hydraulic fluid such that in the absence of fluid pressure, the ridges on said one wall are in contact with the other wall and upon pressurization of the fluid said second wall moves away from the first wall such that the second wall rigidly couples to the element and such that the ridges are spaced a predetermined distance from the other wall.

2. The assembly of claim 1 wherein said second wall comprises a sleeve having an annular outer surface for engaging the element and an annular inner surface and the first wall comprises a cylindrical shaft located in the sleeve and in contact with said annular inner surface.

3. The assembly of claim 2 wherein the said one wall comprises the cylindrical shaft and wherein the grooves are located at the surface of said shaft.

4. The assembly of claim 3 comprising a closed hydraulic system and wherein the means for introducing hydraulic fluid into the recesses comprises a conduit in fluid communication with said recesses.

5. The assembly of claim 4 wherein the means for varying the pressure of the hydraulic fluid comprises a piston located in the conduit such that upon movement of the piston in the conduit in a direction to compress the fluid, the fluid pressure increases and in response thereto the second wall moves outward away from the first wall for rigidly coupling to an element mounted thereon.

6. The assembly of claim 5 wherein the predetermined distance is in the range of about 0.05 mm to 0.3 mm.

7. The assembly of claim 6 wherein the predetermined distance is about 0.05 mm.

8. The assembly of claim 7 wherein said groove comprises a helical groove extending substantially along the region of contact between the first and second walls.

9. The assembly of claim 1 wherein said first wall comprises a first sleeve having an annular inner surface and the second wall comprises a second sleeve located in the first sleeve and having an outer surface in contact with the inner surface of the first sleeve and an inner annular surface for engaging the element.

10. The assembly of claim 9 wherein the said one wall comprises the second sleeve and wherein the grooves are located at the outer surface of said second sleeve.

11. The assembly of claim 10 comprising a closed hydraulic system wherein the means for introducing hydraulic fluid into the recess comprises at least one conduit in fluid communication with said recesses.

12. The assembly of claim 11 wherein the at least one conduit comprises two conduits.

13. The assembly of claim 12 wherein the means for varying the pressure of the hydraulic fluid comprises a piston located in each conduit such that upon movement of the piston in the conduit in a direction to compress the fluid the fluid pressure increases and in response thereto the second wall moves inward away from the first wall for rigidly coupling to element mounted therein.

14. The assembly of claim 13 wherein the predetermined distance is in the range of about 0.05 mm to 0.3 mm.

15. The assembly of claim 14 wherein the predetermined distance is about 0.05 mm.

16. The assembly of claim 15 wherein said groove comprises a helical groove extending substantially along the region of contact between the first and second walls.

17. The assembly of claim 16 wherein the first sleeve has an outer annular surface having screw threads, the assembly comprising a third sleeve threadably engaging the first sleeve said third sleeve coupled to the pistons such that rotation of the third sleeve in a predetermined direction causes the pistons to move in the respective conduits in a direction to pressurize the fluid.

* * * * *

UNITED STATES PATENT AND TRADEMARK OFFICE
CERTIFICATE OF CORRECTION

PATENT NO. : 4,303,150
DATED : Dec. 1, 1981
INVENTOR(S) : Hans O. Olsson

It is certified that error appears in the above—identified patent and that said Letters Patent is hereby corrected as shown below:

Column 2, line 17, "filling" should be -- filled --;
Column 2, line 35, "faces" (second occurrence) should be deleted;
Column 2, line 45, "spaced" should be -- spaces --;
Column 3, line 10, "100" should be -- 101 --;
Column 3, line 17, "100" should be -- 101 --.

Signed and Sealed this

Twenty-fourth Day of August 1982

[SEAL]

Attest:

GERALD J. MOSSINGHOFF

Attesting Officer   Commissioner of Patents and Trademarks